United States Patent [19]

Heucher et al.

[11] Patent Number: 5,719,255
[45] Date of Patent: Feb. 17, 1998

[54] POLYAMIDE BASED ON DIMER FATTY ACID

[75] Inventors: Reimar Heucher, Pulheim; Bettina Becker, Monheim, both of Germany; Angela Rossini, Milan, Italy

[73] Assignee: Henkel Kommanditgesellschaft auf Aktien, Duesseldorf, Germany

[21] Appl. No.: 704,528

[22] PCT Filed: Mar. 6, 1995

[86] PCT No.: PCT/EP95/00817

§ 371 Date: Sep. 11, 1996

§ 102(e) Date: Sep. 11, 1996

[87] PCT Pub. No.: WO95/24439

PCT Pub. Date: Sep. 14, 1995

[30] Foreign Application Priority Data

Mar. 11, 1994 [DE] Germany .................. 44 08 276.2
Apr. 25, 1994 [DE] Germany .................. 44 14 337.0

[51] Int. Cl.⁶ .................................................. C08G 69/34
[52] U.S. Cl. ............... 528/339.3; 528/310; 528/322; 528/338; 528/340; 525/420; 525/420.5; 525/426; 156/325; 156/326
[58] Field of Search .................... 528/310, 322, 528/339.3, 340, 338; 525/420, 426, 420.5; 156/325, 326

[56] References Cited

U.S. PATENT DOCUMENTS

| | | | |
|---|---|---|---|
| 3,531,423 | 9/1970 | Stokes et al. | 528/339.3 |
| 4,777,238 | 10/1988 | Leoni et al. | 528/339.3 |
| 4,810,772 | 3/1989 | Leoni et al. | 528/339.3 |

FOREIGN PATENT DOCUMENTS

| | | |
|---|---|---|
| 0040926 | 12/1981 | European Pat. Off. . |
| 0217145 | 4/1987 | European Pat. Off. . |
| 0334667 | 9/1989 | European Pat. Off. . |
| 2253812 | 7/1975 | France . |
| 1912796 | 10/1969 | Germany . |
| 2361486 | 6/1975 | Germany . |
| 3535732 | 4/1987 | Germany . |
| 4211125 | 10/1993 | Germany . |
| 57-067660 | 4/1982 | Japan . |

OTHER PUBLICATIONS

"Ullmanns Encyklopädie der technischen Chemie", vol. 15, pp. 261, 262 and 263 of the 4th Edition Kunststoffe (plastics).

Passchke, L.E. Peterson and D.H. Wheeler, Journal of the American Oil Chemists' Society, 41,723 (1964).

*Primary Examiner*—P. Hampton-Hightower
*Attorney, Agent, or Firm*—Ernest G. Szoke; Wayne C. Jaeschke; Martin G. Meder

[57] ABSTRACT

A composition of matter useful as a hotmelt adhesive is provided. The adhesive comprises a polyamide based on dimerized fatty acid, preferably having an amine value of less than 2, and at least one heat stabilizer for polyvinyl chloride, preferably selected from the group consisting of alkyl tin carboxylate compounds and epoxy compounds. The heat stabilizer is preferably present in an amount of 0.2% to 10.0% by weight of the composition. Also provided is a method of using the composition as a hotmelt adhesive for polyvinyl chloride.

24 Claims, No Drawings

POLYAMIDE BASED ON DIMER FATTY ACID

BACKGROUND OF THE INVENTION

1. Field of the Invention

This invention relates to a polyamide based on dimer fatty acid and to its use as a hotmelt adhesive for PVC.

2. Discussion of Related Art

Polyamides of the type in question are known. Thus, DE 23 61 486 describes a polyamide prepared from 0.5 to 0.8 equivalent of a polymeric fatty acid containing 70 to 100% by weight of dimeric fatty acid, 0.2 to 0.5 equivalent of a co-dicarboxylic acid with the general formula HOOC—R—COOH, where R is an alkylene group containing 4 to 10 carbon atoms, 0 to 0.6 equivalent of ethylenediamine and 0.4 to 1.0 equivalent of piperazine, the equivalent ratios between the carboxylic acids and the diamines being substantially the same. These polyamides are used as a base for hotmelt adhesives for the heat-resistant gluing of edge veneers, for example of polyvinyl chloride, to wooden boards. A dialkylated phenyl amine is used as antioxidant.

DE 42 11 125 describes a hotmelt adhesive which contains at least 50% by weight of polyamide based on dimerized fatty acid, 5 to 20% by weight of at least one ethylene copolymer from the group consisting of ethylene/vinyl acetate, ethylene/acrylate or ethylene/methacrylate, the alcohol component containing 1 to 18 carbon atoms, 2 to 10% by weight of a copolymer of styrene, ethylene and butylene, 5 to 25% by weight of hydroabietyl alcohol or polybutene, 0 to 10% by weight of at least one resin from the group consisting of polycyclopentadiene, polyterpene, liquid hydrocarbon resin and 0 to 15% by weight of a copolymer of ethylene or propylene and/or maleic acid. These hotmelt adhesives are used for bonding non-pretreated polyethylene and polyvinyl chloride or metals, more particularly copper, lead and aluminium, to one another or to themselves.

EP 40 926 describes a polyamide hotmelt adhesive based on at least one dimer fatty acid and at least one diamine. The amine is said to be used in excess. Irganox 1010, a sterically hindered phenol, is used as stabilizer.

Corresponding polyamides have been successfully used for bonding, sealing and filling moldings, more particularly moldings of PVC, polyamide and polyethylene, in the electrical industry. However, problems can arise under extreme temperature conditions. Thus, the PVC becomes black and brittle over prolonged periods at temperatures above 100° C. The strands of cables can be removed with relatively little effort. The copper is corroded. These problems do not arise either in the case of PA alone or in the case of PVC alone, but only when the two materials come into contact with one another.

SUMMARY OF THE INVENTION

The problem addressed by the present invention was to stabilize the PVC so that it would be better able to withstand even extreme temperatures on contact with polyamides based on dimer fatty acids.

The solution provided by the invention is defined in the claims and essentially lies in the addition of at least one PVC heat stabilizer to the polyamide based on at least one dimer fatty acid.

DETAILED DESCRIPTION OF THE INVENTION

A substance may be regarded as a PVC heat stabilizer if it reduces the elimination of HCl from PVC at temperatures of 180° to 200° C. either as a function of time or in terms of quantity by comparison with PVC which has not been heat-stabilized with that substance. One method of measuring this dehydrochlorination is described in DIN 53381. A PVC material is stabilized when the stability time is reduced, the stability time being defined as the time in which a certain quantity of HCl has formed. A PVC may also be regarded as stabilized when the induction time (beginning of the elimination of HCl) is above 0 because non-stabilized PVC immediately gives off HCl.

Commercial PVC stabilizers may be combined into various groups, for example lead compounds, Ba, Cd, Ca and Zn salts of organic acids, organotin compounds, organic bases, organic phosphites, epoxy compounds and perchlorates.

Organotin compounds are understood to be compounds with at least one Sn-C bond corresponding to the general formula $R^1{}_n SnX_{4-n}$, where n may be a number of 1 to 4, more particularly 2, and $R^1$ may be an aryl or alkyl group containing 1 to 18 and, more particularly, 2 to 8 carbon atoms. X may be an alcoholate group —$OR^2$ or a carboxylate group —$COOR^2$, where $R^2$ is an alkyl group containing 2 to 18 carbon atoms and, more particularly, 4 to 16 carbon atoms. Organotin mercaptides are also of particular importance as PVC stabilizers. Examples of such compounds are dibutyl tin maleate, dibutyl tin dilaurate, dioctyl tin maleate, dibutyl tin mercaptide.

Perchlorate compounds are oxygen compounds of chlorine with the formula $ClO_4{}^\ominus$, the chlorine atom having an oxidation number of 7. Of particular significance are the salts of perchloric acid such as, for example, sodium perchlorate ($NaClO_4$) or potassium perchlorate ($KClO_4$). The most important perchlorate, from which all other perchlorates can be produced, is sodium perchlorate. It is produced by the electrochemical oxidation of sodium chlorate. These compounds are used to stabilize PVC, preferably by employing per chlorates, such as sodium perchlorate, in glycol ethers, such as methyl diglycol for example.

Epoxy compounds have at least one three-membered ring formed by two carbon atoms and one oxygen atom. Epoxides are highly reactive systems by virtue of their high ring strain. Under the catalytic effect of acids in particular, they react readily with opening of the ring. In contrast to open-chain ethers, epoxides also react with basic compounds and Grignard reagents. The following compounds are mentioned as examples: epoxidized soybean oil, 3,4-epoxycyclohexyl methyl-3,4-epoxycyclohexane carboxylate.

The organic phosphites are phosphorus compounds with the general formula $PO_3R^3$. The P atom is attached by three oxygen atoms to three identical or different alkyl or aryl groups. Example: diphenyl decyl phosphite. The alkyl group has 1 to 16 carbon atoms and, more particularly, 8 to 12 carbon atoms. The aryl group is formed in particular by the phenyl group.

The metal stabilizers mentioned (Ba, Cd, Ca, Zn) are based on carboxylic acid salts, often in conjunction with phenolate. In the case of barium for example, they may be described by the general formula $Ba(-O-CO-R^4)_2$, where $R^4$ is a linear or branched alkyl group containing 8 to 36 and, more particularly, 12 to 24 carbon atoms or an alkyl aryl group, in which case the alkyl group preferably contains 1 to 12 carbon atoms. Systems such as these often have a synergistic effect in combination with one another.

β-Aminocrotonic acid ester is mentioned as an example of an organic base.

Other examples of PVC stabilizers can be found in relevant specialist books, cf. in particular "Ullmanns Encyklopädie der technischen Chemie", Vol. 15, pages 261, 262 and 263 of the 4th Edition (keyword: "Kunststoffe (plastics)"). The stabilizers in question are not PA stabilizers.

The described compounds may be added in various concentrations according to the strength of the required effect. To ensure that the PVC remains usable after 240 hours at 125° C., the concentration should be between 0.2 and 10.0% by weight and, more particularly, between 0.5 and 5.0% by weight, based on the polyamide. The concentration also depends on the polyamide itself, on its production and on its composition. A requirement which the PVC-stabilizing compound has to satisfy is that it should lend itself to uniform incorporation in the polyamide, should not egress again, even at relatively high temperatures and should retain its function, for example as an acid binding agent. Comparatively large molecules are particularly effective because they also have a screening effect, i.e. they protect PVC and PA from one another. Preferably, the transparency of the polyamide is only slightly affected.

The hotmelt adhesive according to the invention contains a polyamide based on dimerized fatty acid as its key component. "Dimerized fatty acids" are obtained by coupling unsaturated long-chain monobasic fatty acids, for example linolenic acid, oleic acid. It is a mixture of several isomers (cf. R. F. Paschke, L. E. Peterson and D. H. Wheeler, Journal of the American Oil Chemists' Society, 41,723 (1964). Trimers and other oligomers may of course also be present in small amounts. The acids have been known for some time and are commercially available.

The polyamides according to the invention preferably have the following composition:

35 to 49.5 mole-% of dimerized fatty acid and 0.5 to 15 mole-% of monomeric $C_{12-22}$ fatty acid, 2 to 35 mole-% of polyether diamines corresponding to the following general formula:

$$H_2N-R_5-O-(R_6O)_x-R_7-NH_2 \qquad (I)$$

in which x is a number of 8 to 80, mainly 8 to 40, $R_5$ and $R_7$ may be the same or different and represent aliphatic and/or cycloaliphatic hydrocarbon radicals preferably containing 2 to 8 carbon atoms, $R_6$ is an optionally branched aliphatic hydrocarbon radical containing 1 to 6 carbon atoms, and 15 to 48 mole-% of aliphatic $C_{2-40}$ diamines, up to two thirds of the dimerized fatty acids being replaceable by aliphatic $C_{4-12}$ dicarboxylic acids.

However, it is also favorable to use a polyamide obtained from:

20 to 49.5 mole-% of dimerized fatty acid and 0.5 to 15 mole-% of monomeric $C_{12-22}$ fatty acid and 20 to 55 mole-% of a $C_{2-40}$ amine containing at least two primary amino groups, up to two thirds of the dimerized fatty acids being replaceable by aliphatic dicarboxylic acids containing 4 to 12 carbon atoms.

In addition, the polyamides used in accordance with the invention may contain other raw materials typically encountered in hotmelt adhesives. Thus, aliphatic dicarboxylic acids in particular are typical raw materials. Suitable aliphatic carboxylic acids preferably contain 4 to 12 carbon atoms. For example, glutaric acid, maleic acid, succinic acid, adipic acid, pimelic acid, suberic acid and even sebacic acid are suitable. In molar terms, up to two thirds of these acids may be replaced by dimer fatty acid. It is known to the expert in this regard that the melting points of polyamides can be increased to a certain extent by addition of sebacic acid. Other possible raw materials for hotmelt adhesives are long-chain aminocarboxylic acids, such as 11-aminoundecanoic acid, or even lauryl lactam. The polyamide raw materials known in fiber chemistry, such as caprolactam for example, may also be used in small quantities. These substances enable the expert to increase the melting point within certain limits.

So far as the amine components in the polyamides are concerned, polyether polyols terminated by primary amino groups are preferred. Suitable amino-terminated polyether polyols are based on polyethylene glycol, polypropylene glycol or polytetrahydrofuran. Amino-terminated polyether polyols which are insoluble or only sparingly soluble in water are preferred. The amino-terminated polyether polyols used have molecular weights of 700 to 3,500 or even in the range from 1,200 from 2,500. A particularly suitable class of raw materials are, for example, the bis-(3-aminopropyl)-polytetrahydrofurans with a molecular weight of 700 to 3,500 or the bis-(2-aminopropyl)-polyoxypropylenes with a molecular weight of 1,200 to 2,500. Linear $C_{2-10}$ alkylene diamines, for example hexamethylenediamine, 1,3-diaminopropane, 1,4-diaminobutane, may also be used. Piperazine and dipiperidyl propane are also suitable. Another suitable class of diamines is derived from the dimer fatty acids and contains primary amino groups instead of the carboxyl groups. Such substances are often called dimer diamines. They are obtained by nitrile formation from the dimerized fatty acids and subsequent hydrogenation.

The following observations are made regarding the molecular structure of the polyamides on which the compatible mixtures according to the invention are based: it is known to the expert active in this field that monofunctional, difunctional and trifunctional raw materials are used in a certain ratio to obtained fusible, i.e. non-crosslinked, products. General knowledge of polymer chemistry is relevant in this regard. Accordingly, in the event of crosslinking/gelation, the tendency towards gelation can be eliminated by reducing the content of trifunctional components (trimer fatty acids) and/or by increasing the content of monofunctional amines or fatty acids. The molecular weight of the hotmelt adhesives according to the invention can best be calculated from the molecular weight of the individual components by terminal group titration of the terminal amino or acid groups.

The hotmelt adhesives according to the invention preferably have an amine value of less than 2.0 and, more particularly, less than 0.8.

The amine value is defined as the quantity of KOH in mg which is equivalent to 1 g of the substance. It is determined in accordance with DIN 16945, page 1, under the following conditions: around 10 g of the polyamide hotmelt adhesive to be investigated are carefully weighed into an Erlenmeyer flask and 100 ml of a cold mixture of methyl isobutyl ketone/butanol (equal parts by volume) are added. The sample is then dissolved by heating. After cooling, 50 ml of ethanol and 3 ml of bromcresol green are added. Titration is carried out with a 0.5N hydrochloric acid.

The low amine value can be reached in various ways, for example by using an excess of the acid component in the condensation reaction or by reacting the terminal amino groups with reactive compounds, for example with cycloaliphatic epoxides. One example of such a compound is 3,4-epoxycyclohexyl methyl-3,4-epoxycyclohexane carboxylate. Satisfactory stability may well be achieved in this way alone. It is of course also possible to reduce the terminal groups, in which case a higher molecular weight is obtained.

In addition, the polyamide should not be stabilized with an amine, but rather with a sterically hindered phenol in a quantity of 0.5 to 3.0% by weight and, more particularly, in a quantity of 1.0 to 2.0% by weight. Examples of such compounds include 2,6-ditert.butyl-4-methylphenol and phenol-4,4',4"-[(2,4,6-trimethyl-1,3,5-benzenetryl)-tris-(methylene)]-tris-(2,6-bis-(1,1-dimethylethyl).

In addition, other additives, for example carbon black, resins, waxes, pigments, plasticizers, may be incorporated in the polyamide.

The polyamide according to the invention may be produced from the above-mentioned components in known manner, for example in accordance with the cited prior art.

Addition of the PVC heat stabilizer to the PA has the advantage that the favorable properties of the polyamide based on dimer fatty acid remain intact, in addition to which the PVC is protected against ageing when it comes into contact with the polyamide. Further advantages include improved adhesion of the polyamide to PVC after storage at high temperatures which enhances the required sealing effect. In addition, measurement of the angular peel strength of polyamide on PVC reveals a change from adhesive to cohesive failure after storage at high temperatures.

In addition, where various epoxy compounds are used, the polyamide is additionally stabilized irrespective of the PVC problems. In contrast to normal polyamide hotmelt adhesives, there is no reduction in viscosity and only a slight darkening of color after storage for 8 hours at 210° C.

By virtue of these advantages, the polyamide according to the invention is suitable for sealing, bonding and filling PVC moldings, particularly in the electrical industry. Specific examples include the encapsulation of plugs fitted with PVC cabling which are used at temperatures above 100° C. and the sealing of cable groups and cable bushings of PVC which are also used at relatively high temperatures.

The invention is illustrated by the following Examples:

I. MATERIALS

1. PVC

A PVC cable of temperature class 2 was used.

2. Sample 1

A polyamide based on dimer fatty acid was prepared as described above. It contained the amine stabilizer Vulkanox DDA (4-(1-phenylethyl)-N-(4-(1-phenylethyl)phenyl), of which 2% by weight was added during the production of the PA. It had an amine value of 0.6 and an acid value of 7.3.

3. Sample 2

The polyamide is comparable with sample 1 but was stabilized with 2% by weight of the phenolic compound Alvinox 100 (1,3,5-trimethyl-2,4,6-tris(3,5-ditert.butyl-4-hydroxybenzyl) benzene).

4. Sample 3

The polyamide is comparable with sample 2 but also contains 5.0% by weight of the epoxy compound ERL 4221 (3,4-epoxycyclohexylmethyl-3,4-epoxycyclohexyl carboxylate).

5. Sample 4

The polyamide is also based on sample 2 but additionally contains 1.0% by weight of butyl tin maleate.

6. Sample 5

The polyamide is comparable with sample 2 but additionally contains 1.0% by weight of sodium perchlorate in diethylene glycol monomethyl ether (35%).

The mixtures were prepared by heating the polyamide beyond its softening point and adding the stabilizer with stirring.

II TEST PROCEDURE

The above materials were bonded at 230° C. The polyamide hotmelt adhesive was melted at 230° C. The PVC cable was placed in a Teflon mold which had been cut to the circumference of the cable, i.e. half the circumference of the cable was in the mold. The polyamide was then cast onto the cable. After cooling of the adhesive, the bond was removed from the mold. The cable was now half encapsulated in the polyamide. The bonds were stored in air for 10 days at t 25° C. in the absence of light.

III TESTS

The samples were visually examined and tensile-tested. The properties obtained are set out in Table I. If the sample could not be peeled, it was classified as brittle. The angular peel strength was determined in accordance with DIN 53282 and DIN 53539. "Adhesion" in the evaluation of the fracture pattern signifies the smooth separation of polyamide and PVC. In the event of cohesive failure, the polyamide breaks within itself, i.e. adhesive residues remain on the PVC material.

TABLE 1

| Properties Before/After Heating | PVC | Sample 1 | Sample 1 + PVC |
|---|---|---|---|
| PVC | | | |
| Color of bond | | | White/black |
| Color elsewhere | | | White/brown |
| Color without PA | White/light brown | | |
| Brittleness | Non-brittle/slightly brittle | | Non-brittle/brittle |
| Angular peel strength | | | 7.5 N/mm/- |
| Fracture pattern | | | Adhesion/PVC breaks |
| PA | | | |
| Color of bond | | | Amber/black |
| Color elsewhere | | | Amber/light brown |
| Color without PVC | | Amber/light brown | |
| CU | | | |
| Appearance | Metallic sheen/slightly discolored | | Metallic sheen/ corrod. green |

TABLE 1-continued

| Properties Before/After Heating | Sample 2 + PVC | Sample 3 + PVC | Sample 4 + PVC | Sample 5 + PVC |
| --- | --- | --- | --- | --- |
| PVC | | | | |
| Color of bond | White/Black | White/light brown | White/brown | White/brown |
| Color elsewhere | White/light brown | White/light brown | White/light brown | White/light brown |
| Color without PA | | | | |
| Brittleness | Non-brittle/brittle | Non-brittle/slightly brittle | Non-brittle/slightly brittle | Non-brittle/slightly brittle |
| Angular peel strength | 7.5 N/mm/- | 9.5 N/mm/14 N/mm | 8.0 N/mm/9.9 N/mm | 0.8 N/mm/8.9 N/mm |
| Fracture pattern | Adhesion/PVC breaks | Adhesion/slight cohesion | Adhesion/cohesion | Adhesion/cohesion |
| PA | | | | |
| Color of bond | Amber/black | Amber/amber | Amber/brown | Amber/brown |
| Color elsewhere | Amber/light brown | Amber/Amber | Amber/brown | Amber/light brown |

The Table shows the following:
1) Amine-stabilized polyamide (sample 1 ): after storage for 240 h at 125° C., the PVC becomes black and brittle, the polyamide becomes black at the bond.
2) Phenol-stabilized polyamide (sample 2): after storage for 240 h at 125° C., the above-mentioned effects still occur, but not as seriously; the PVC still breaks under stress.
3) Polyamide with phenol stabilizer and PVC stabilizer (samples 3, 4, 5): after storage for 240 h at 125° C., the effects mentioned above are far less serious. The PVC is peelable and does not fail under stress.

What is claimed is:

1. A composition of matter useful as a hotmelt adhesive comprising a polyamide based on dimerized fatty acid and at least one heat stabilizer for polyvinyl chloride.
2. The composition of claim 1 wherein said heat stabilizer comprises 0.2% to 10% by weight of said composition.
3. The composition of claim 1 wherein said heat stabilizer comprises 0.5% to 5% by weight of said composition.
4. The compositon of claim 1 wherein said heat stabilizer is a organotin compound.
5. The composition of claim 4 wherein said heat stabilzier is an alkyl tin carboxylate, the alkyl group of said alkyl tin carboxylate having 1 to 18 carbon atoms and the carboxylate group of said alkyl tin carboxylate having 2 to 18 carbon atoms.
6. The composition of claim 4 wherein said heat stabilizer is an alkyl tin carboxylate, the alkyl group of said alkyl tin carboxylate having 2 to 8 carbon atoms and the carboxylate group of said alkyl tin carboxylate having 4 to 16 carbon atoms.
7. The composition claimed in claim 4 wherein said heat stabilizer is selected from the group consisting of dibutyl tin dilaurate, dibutyl tin maleate, dibutyl tin bis-octyl thioglycolate, dioctyl tin maleate and dibutyl tin mercaptide.
8. The composition of claim 1 wherein said heat stabilizer is an epoxy compound.
9. The composition claimed in claim 4 wherein said epoxy compound is selected from the group consisting of epoxidized soybean oil and 3,4-epoxycyclohexyl methyl-3,4-epoxycyclohexane carboxylate.
10. The composition claimed in claim 1 wherein said polyamide is obtained from:

35 to 49.5 mole-% of dimerized fatty acid,
0.5 to 15 mole-% of monomeric $C_{12-22}$ fatty acid,
2 to 35 mole-% of a polyether diamine corresponding to the following general formula:

$$H_2N-R_5-O-(R_6O)_x-R_7-NH_2 \quad (I)$$

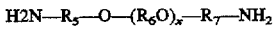

in which
x is a number of 8 to 80,
$R_5$ and $R_7$ may be the same or different and represent aliphatic and/or cycloaliphatic hydrocarbon radicals,
$R_6$ is an aliphatic hydrocarbon radical containing 1 to 6 carbon atoms, and
15 to 48 mole-% of aliphatic $C_{2-40}$ diamines, provided that up to two thirds of said dimerized fatty acids my be replaced by aliphatic $C_{4-12}$ dicarboxylic acids.

11. The composition claimed in claim 10 wherein x is 8 to 40 and $R_5$ and $R_7$ have 2 to 8 carbon atoms.
12. The composition claimed in claim 1 wherein said polyamide has an amine value of less than 2.
13. The composition claimed in claim 1 wherein said polyamide has an amine value of less than 0.8.
14. The composition claimed in claim 1 further comprising 0.5% to 3.0% by weight of a sterically hindered phenol.
15. The composition claimed in claim 14 wherein said sterically hindered phenol is selected form the group consisting of 1,3,5-trimethyl-2,4,6-tris(3,5-ditert.butyl-4-hydroxybenzyl)benzene, and 2,6-ditert.butyl-4-methylphenol.
16. The composition claimed in claim 1 further comprising 1.0% to 2.0% by weight of a sterically hindered phenol selected form the group consisting of 1,3,5-trimethyl-2,4,6-tris(3,5-ditert.butyl-4-hydroxybenzyl)benzene, and 2,6-ditert.butyl-4-methylphenol.
17. A composition of matter useful as a hotmelt adhesive comprising a polyamide based on dimerized fatty acid having an amine value of less than 2 and being obtained from:

35 to 49.5 mole-% of dimerized fatty acid,
0.5 to 15 mole-% of monomeric $C_{12-22}$ fatty acid,
2 to 35 mole-% of a polyether diamine corresponding to the following general formula:

$$H_2N-R_5-O-(R_6O)_x-R_7-NH_2 \quad (I)$$

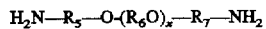

in which
x is a number of 8 to 80,
$R_5$ and $R_7$ may be the same or different and represent aliphatic and/or cycloaliphatic hydrocarbon radicals,
$R_8$ is an aliphatic hydrocarbon radical containing 1 to 6 carbon atoms, and
15 to 48 mole-% of aliphatic $C_{2-40}$ diamines, provided that up to two thirds of said dimerized fatty acids my be replaced by aliphatic $C_{4-12}$ dicarboxylic acids, and and 0.2% to 10% by weight of said composition of at least one heat stabilizer for polyvinyl chloride selected from the group consisting of alkyl tin carboxylate compounds and epoxy compounds.

18. The composition of claim 17 wherein said heat stabilizer is selected from the group consisting of dibutyl tin dilaurate, dibutyl tin maleate, dibutyl tin bis-octyl thioglycolate, dioctyl tin maleate, dibutyl tin mercaptide, epoxidized soybean oil, and 3,4-epoxycyclohexyl methyl-3,4-epoxycyclohexane carboxylate.

19. In a method of bonding polyvinyl chloride, the improvement comprising using as an adhesive, the composition claimed in claim 1.

20. The method of claim 13 wherein a metal selected from the group consisting of copper and tin-plated copper are bonded to said polyvinyl chloride.

21. In a method of sealing and bonding polyvinyl chloride moldings, the improvement comprising using the composition claimed in claim 1.

22. The method of claim 21 wherein said method comprises the encapsulation of plugs fitted with polyvinyl chloride cabling.

23. The method of claim 21 wherein said method comprises the sealing of cable groups and cable bushings of polyvinyl chloride.

24. In a method of sealing and bonding polyvinyl chloride moldings, the improvement comprising using the composition claimed in claim 17.

* * * * *